(12) United States Patent
Ishikawa

(10) Patent No.: US 8,125,542 B2
(45) Date of Patent: Feb. 28, 2012

(54) IMAGING DEVICE USING A FIRST MOTION VECTOR IN AN IMAGE THAT IS OBTAINED VIA AN IMAGING SYSTEM THAT CAN PERFORM ZOOMING AND A SECOND MOTION VECTOR CAUSED BY PERFORMING ZOOMING OF THE IMAGE

(75) Inventor: Daisuke Ishikawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 1673 days.

(21) Appl. No.: 11/322,621

(22) Filed: Dec. 30, 2005

(65) Prior Publication Data

US 2006/0152604 A1 Jul. 13, 2006

(30) Foreign Application Priority Data

Jan. 11, 2005 (JP) ................................. 2005-003693

(51) Int. Cl.
*H04N 5/262* (2006.01)

(52) U.S. Cl. ................... 348/240.99; 348/347; 348/699; 375/240.16

(58) Field of Classification Search ............. 348/240.99, 348/240.2, 240.3, 347, 240.1, 699–701; 375/240.16–17
See application file for complete search history.

(56) References Cited

U.S. PATENT DOCUMENTS

| 5,291,300 | A | * | 3/1994 | Ueda | 386/117 |
|---|---|---|---|---|---|
| 5,712,474 | A | * | 1/1998 | Naneda | 250/208.1 |
| 5,835,641 | A | * | 11/1998 | Sotoda et al. | 382/291 |
| 6,236,682 | B1 | * | 5/2001 | Ota et al. | 375/240.16 |
| 6,389,168 | B2 | * | 5/2002 | Altunbasak et al. | 382/224 |
| 6,396,538 | B1 | * | 5/2002 | Kobayashi et al. | 348/240.99 |
| 6,577,343 | B2 | * | 6/2003 | Ohkawara | 348/347 |
| 7,646,891 | B2 | | 1/2010 | Kage et al. | |
| 2002/0012522 | A1 | * | 1/2002 | Kawakami et al. | 386/52 |
| 2002/0154912 | A1 | * | 10/2002 | Koseki et al. | 396/429 |
| 2005/0063467 | A1 | * | 3/2005 | Hekstra et al. | 375/240.16 |
| 2006/0152590 | A1 | | 7/2006 | Kage et al. | |

FOREIGN PATENT DOCUMENTS

| EP | 1578116 A1 | 9/2005 |
|---|---|---|
| EP | 1578116 B1 | 12/2009 |
| JP | 07-050773 A | 2/1995 |
| JP | 07-095590 A | 4/1995 |
| JP | 7-203280 A | 8/1995 |
| WO | WO2004/062270 A1 | 7/2004 |

* cited by examiner

*Primary Examiner* — Tuan Ho
*Assistant Examiner* — Kent Wang
(74) *Attorney, Agent, or Firm* — Canon USA, Inc. I.P. Division

(57) ABSTRACT

At least one exemplary embodiment is directed to an imaging device which includes a detecting unit that detects a first motion vector in an image that is obtained via an imaging system that can perform zooming, and a storage unit that stores in advance a second motion vector caused by performing zooming of the image.

12 Claims, 8 Drawing Sheets

| x=−5 y=3 | x=−3 y=3 | x=−1 y=3 | x=1 y=3 | x=3 y=3 | x=5 y=3 |
|---|---|---|---|---|---|
| x=−5 y=1 | x=−3 y=1 | x=−1 y=1 | x=1 y=1 | x=3 y=1 | x=5 y=1 |
| x=−5 y=−1 | x=−3 y=−1 | x=−1 y=−1 | x=1 y=−1 | x=3 y=−1 | x=5 y=−1 |
| x=−5 y=−3 | x=−3 y=−3 | x=−1 y=−3 | x=1 y=−3 | x=3 y=−3 | x=5 y=−3 |

IMAGING DEVICE USING A FIRST MOTION VECTOR IN AN IMAGE THAT IS OBTAINED VIA AN IMAGING SYSTEM THAT CAN PERFORM ZOOMING AND A SECOND MOTION VECTOR CAUSED BY PERFORMING ZOOMING OF THE IMAGE

BACKGROUND OF THE INVENTION

1. Field of the Invention

The present invention relates to methods for image processing using motion vectors in imaging devices.

2. Description of the Related Art

Conventional methods have been proposed, in which motion vectors between frames or fields of moving images that are captured are detected for reducing the blurring of images, where the blurring can be caused by, for example, by hand-shake that occurs at the time of shooting the images. The conventional systems also determine whether a subject is a moving subject, and can also perform image compression.

Blurring of an image is reduced by, for example, shifting an image area to be output of the image obtained from an image pickup element or moving a part of an optical system in the direction perpendicular to the optical axis, on the basis of the result of detecting the motion vectors.

Unfortunately, for example, when the viewing angle is changed by optical zooming or an image is magnified or reduced by electronic zooming, the motion vector caused by the zooming operation may be erroneously detected as a motion vector caused by shaking of the device. This is because a motion vector is caused by a change in the viewing angle or an image.

Thus, a method for reducing blurring of an image is discussed in Japanese Patent Laid-Open No. 7-203280 (especially, paragraphs 19 to 27 and FIGS. 6 to 10). In this method, the position, or the size of a detection area for detecting motion vectors is changed according to the state of zooming, and motion vectors are detected for a plurality of representative points in the detection area. When these motion vectors satisfy predetermined conditions, it is assumed that these motion vectors are not those caused by zooming but those caused by shaking of the device, and the subsequent blurring of the image is reduced. Thus, even when an imaging device has a zooming function, blurring of an image can be reduced using motion vectors.

However, even in the method discussed in Japanese Patent Laid-Open No. 7-203280, detection of motion vectors caused by shaking of the device while zooming is performed and reduction of the blurring of an image on the basis of the result of the detection cannot be performed. That is to say, when shaking of the device occurs while zooming is performed, it is difficult to extract only the motion vectors caused by the shaking of the device from the detected motion vectors. This is because only the vector sum of the motion vector caused by zooming and the motion vector caused by shaking of the device is detected when the shaking of the device occurs while zooming is performed.

Moreover, recently, the speed of a zooming operation has been improved. In this situation, when motion vectors caused by zooming extend beyond a detection area for detecting motion vectors, the motion vectors cannot be detected.

SUMMARY OF THE INVENTION

At least one exemplary embodiment is directed to a method for suppressing blurring of an image while zooming is performed on the basis of motion vectors that are detected while zooming is performed.

An imaging device according to a first exemplary embodiment includes a detecting unit that detects a first motion vector in an image that is obtained via an imaging system that can perform zooming, and a storage unit that stores in advance a second motion vector caused by performing zooming of the image.

An optical instrument according to a second exemplary embodiment includes a detecting unit that detects a first motion vector in an image that is obtained via an imaging system that can perform zooming, and a control unit that controls the zooming so that the quantity of a second motion vector caused by performing zooming in the image does not exceed a detectable range of the first motion vector.

A device in accordance with at least one exemplary embodiment can reduce the blurring of an image or detect a moving subject, while zooming is performed.

Further features of the present invention will become apparent from the following description of exemplary embodiments with reference to the attached drawings.

DESCRIPTION OF THE EMBODIMENTS

Figure 1:
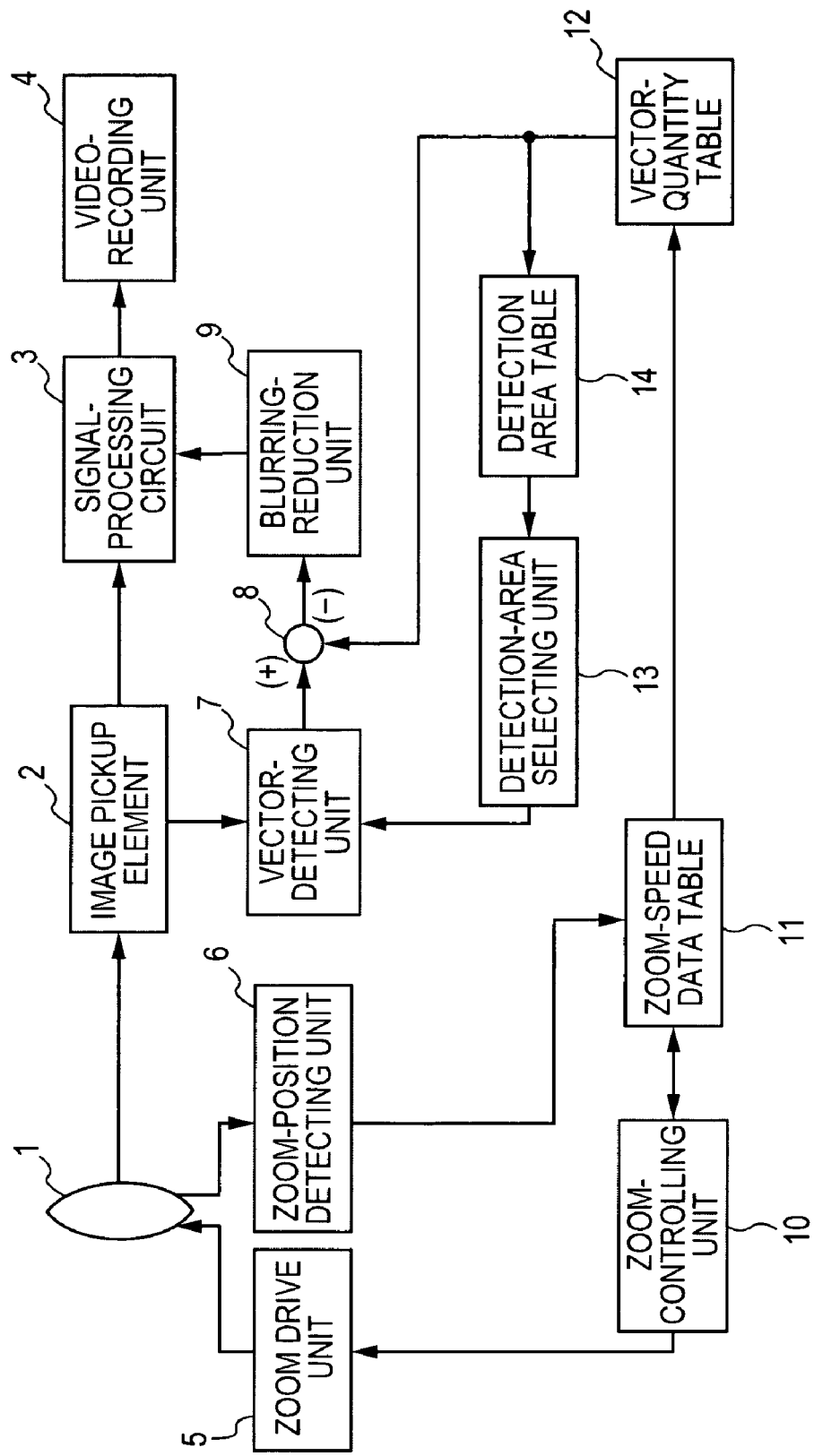
FIG. 1 is a system block diagram showing the structure of an imaging device according to a first exemplary embodiment.

The following description of exemplary embodiments is merely illustrative in nature and is in no way intended to limit the invention, its application, or uses.

Exemplary embodiments can be operatively connected to various imaging devices (e.g., electronic cameras, camcorders, digital still cameras, film cameras, broadcast cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example, a zoom-position detecting unit is mentioned and any appropriate zoom-position detecting unit as known by one of ordinary skill in the relevant arts and equivalents should fall within the scope of exemplary embodiments.

Additionally exemplary embodiments are not limited to visual imaging devices (e.g., optical photographic systems), for example the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

Exemplary embodiments will now be described with reference to the drawings.

First Exemplary Embodiment

FIG. 1 is a system block diagram showing the structure of an imaging device (e.g., video cameras, digital cameras, optical instruments, other imaging devices as known by one of ordinary skill in the relevant arts and equivalents) having a moving-image shooting function, according to a first exemplary embodiment.

As shown in FIG. 1, the imaging device includes an optical imaging system 1 that includes an optical element (e.g., a zoom lens) and an image pickup element (photoelectric transducer) 2 that performs photoelectric conversion on an image of a subject formed by the optical imaging system 1 (e.g., a charge-coupled device (CCD) sensor or a complementary metal-oxide semiconductor (CMOS) sensor, other photoelectric conversion elements as known by one of ordinary skill in et relevant art and equivalent).

The imaging device further includes a vector-detecting unit 7 that detects motion vectors in an image obtained by the image pickup element 2, a zoom drive unit 5 that drives a zoom lens (not shown) included in the optical imaging system 1, a zoom-position detecting unit 6 that detects the position of a zoom lens, a zoom-speed data table 11 that stores in advance data of zoom speeds corresponding to zoom lens positions, and a zoom-controlling unit 10 that controls the zoom drive unit 5 on the basis of the data of zoom speeds stored in the zoom-speed data table 11.

The imaging device further includes a vector-quantity table 12 that stores in advance vector quantities corresponding to movement speeds of a zoom lens (hereinafter referred to as zoom speeds). In this case, the vector of interest represents a second motion vector caused in an image by a change in the viewing angle due to the movement of the zoom lens (e.g., a change in a zoom magnification), i.e., zooming.

The imaging device can further include a detection area table 14 that stores detection areas, for detecting motion vectors in an image, corresponding to values stored in the vector-quantity table 12. The image device can further include a detection-area selecting unit 13 that selects a plurality of valid detection areas for detecting motion vectors with reference to the detection area table 14, and a vector-calculating unit 8 that calculates a third motion vector. The third motion vector is the vector difference between the second motion vector, which is caused by zooming and derived from the vector-quantity table 12, and a first motion vector that is detected in a detection area.

The imaging device can further include a blurring-reduction unit 9 that reduces blurring of an image that is caused by, for example, shaking of the imaging device. Where the reduction can be on the basis of the third motion vector calculated by the vector-calculating unit 8. The imaging device can further include a signal-processing circuit 3 that generates video signals (an output image) in which blurring of the image is suppressed (reduced). Suppression of the blurring of an image is performed on the basis of output signals (an image that has not had blurring reduced) from the image pickup element 2 and reduction signals generated by the blurring-reduction unit 9. The imaging device further includes a video-recording unit 4 that records the video signals generated by the signal-processing circuit 3 on a recording medium (e.g., a semiconductor memory, an optical disk, a magnetic tape, other recording medium as known by one of ordinary skill in the arts and equivalents).

Figure 2:
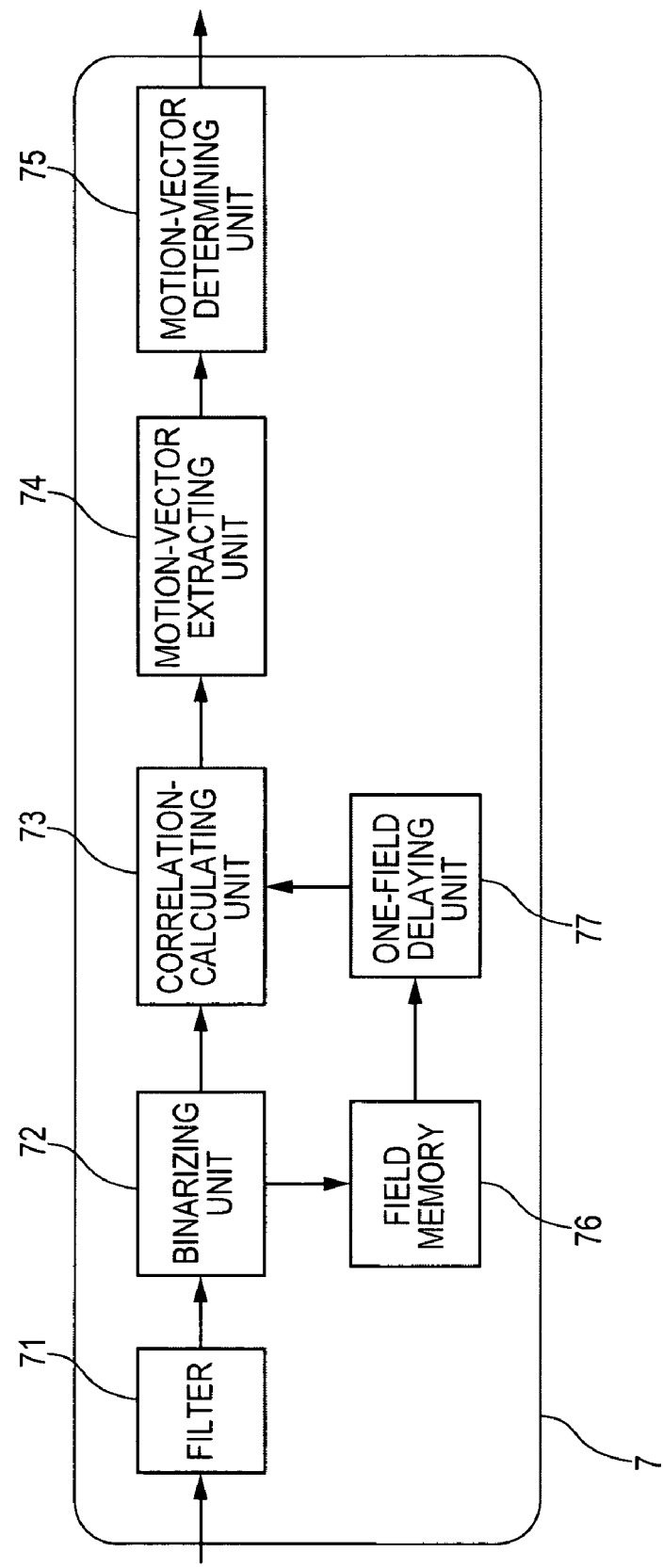
FIG. 2 is a block diagram showing the structure of a vector-detecting unit provided in the imaging device according to the first exemplary embodiment.

The vector-detecting unit 7 will now be described in detail with reference to FIG. 2. Output signals (luminance signals) from the image pickup element 2 pass through a filter 71. The filter 71 extracts spatial frequency components that are suitable for detecting motion vectors from the output signals and reduces or eliminates high frequency components. A binarizing unit 72 binarizes the signals having passed through the filter 71 on the basis of a predetermined threshold value. The signals (hereinafter referred to as a binarized image) binarized by the binarizing unit 72 are temporarily stored in a field memory 76 in a state such that the binarized signals are delayed by one field period.

Figure 3:
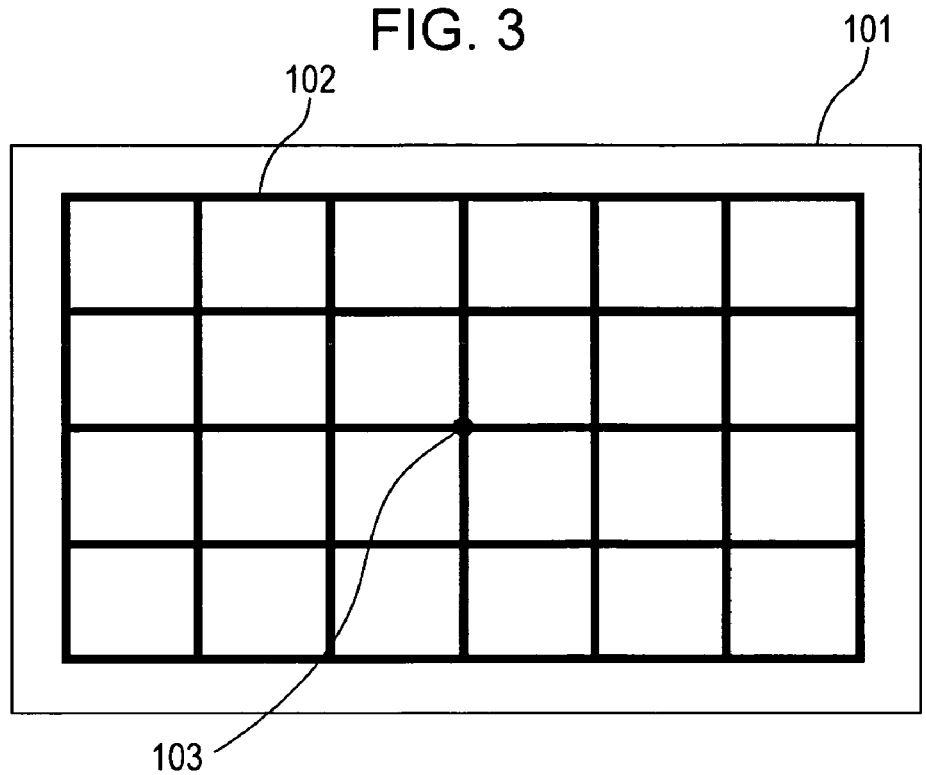
FIG. 3 is a schematic diagram showing detection areas for detecting motion vectors.

In a predetermined range, a correlation-calculating unit 73 searches for a target area, in the preceding field, that includes the most pixels having the same pixel values as those in a base area in the current field. Specifically, such an area is searched for by moving a binarized image of the preceding field stored in the field memory 76 pixel by pixel on the basis of a binarized image of the current field that is obtained from the image pickup element 2 via the filter 71 and the binarizing unit 72. This operation is performed for individual detection areas 102 (FIG. 3) that are obtained by dividing a motion-vector search area 101 (a binarized image) of one field. A motion-vector extracting unit 74 extracts (calculates) motion vectors between any two consecutive field images (binarized images) for the individual detection areas 102. Alternatively, motion vectors may be detected between frame images.

In an exemplary method for extracting (calculating) a motion vector, a block in the preceding field, having the weakest correlation with a block in the current field, is searched for, and the shift between the blocks is determined as a motion vector.

Figures 12, 13:
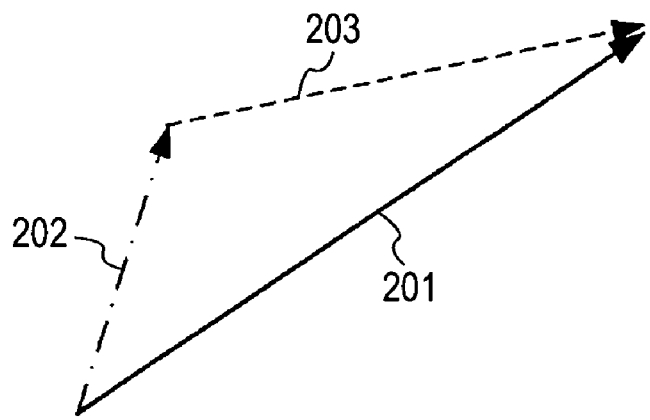
FIG. 12 is a schematic view showing relationships between a first motion vector that is detected, a second motion vector caused by zooming, and a third motion vector caused by shaking of the imaging device in the first and second exemplary embodiments.
FIG. 13 is a schematic view showing an exemplary vector-quantity table in the first and second exemplary embodiments.

In a case where a motion vector is extracted while zooming is performed (a change in the viewing angle), the more distant from the center point 103 (FIG. 4) a detection area 102 of an image is located in a radial direction, the larger the quantity (value) of the corresponding motion vector is. Thus, a detection error can occur. Accordingly, quantities of corresponding motion vectors caused by zooming (a change in the viewing angle) are stored for the individual detection areas 102 in advance, as shown in FIG. 13. The detection-area selecting unit 13 can determine the validity of each detection area 102 on the basis of the data in the detection area table 14 so as to avoid a detection area 102 in which a detection error occurs.

The motion vectors obtained in the individual detection areas 102 are supplied to a motion-vector determining unit 75. The motion-vector determining unit 75 determines one motion vector between any two consecutive fields. This motion vector is determined as the representative motion vector between the two consecutive fields. In an exemplary method for determining a representative motion vector between any two consecutive fields by using the motion-vector determining unit 75, the motion vectors in the individual detection areas 102 between the two consecutive fields are processed into a histogram, and the median of the histogram is determined as the representative motion vector between the two consecutive fields.

Since the first motion vector obtained by the vector-detecting unit 7 represents movement between images of two consecutive fields, the quantity of the first motion vector is proportional to the amount of movement per unit time. Thus, a first motion vector that is adjusted so as to be suitable for the subsequent process can be obtained by performing a filtering process, such as performing integration once or more than once, on the quantity of the first motion vector.

Figure 5:
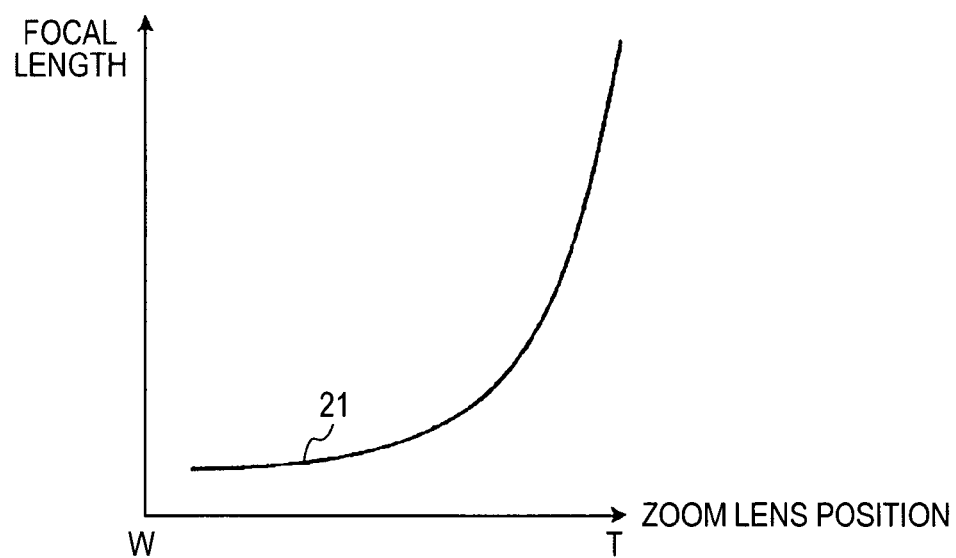
FIG. 5 is a graph showing the relationship between the zoom lens position and the focal length.

The relationship between the position of a zoom lens and the focal length will now be described. FIG. 5 shows general characteristics of a zoom lens included in the optical imaging system 1. In FIG. 5, the ordinate indicates the focal length, and the abscissa indicates the zoom lens position. The ratio of a change in the focal length to a change in the zoom lens position is small at the wide (W) side (wide-angle side), and the ratio is conversely large at the telephoto (T) side.

Figure 4:
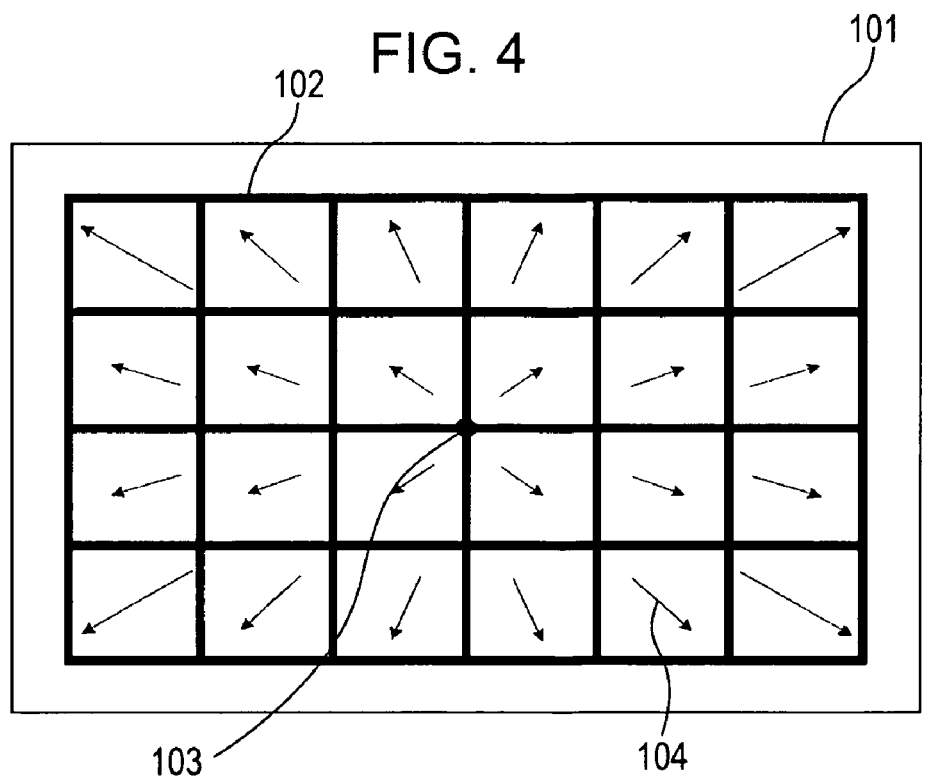
FIG. 4 is a schematic view showing exemplary motion vectors caused by zooming in the individual detection areas.

The motion vector (the second motion vector) caused by zooming is determined by the rate of change of the viewing angle. For example, motion vectors 104 (FIG. 4) that are oriented in radial directions from the center point 103 occur in the process of zooming from the wide side to the telephoto side, as shown in FIG. 4. The quantity of each motion vector 104 varies with the position of the corresponding detection area 102 in the motion-vector search area 101. The more distant from the center point 103 in a radial direction the detection area 102 is located, the larger the quantity of the corresponding motion vector 104 is. In this case, the probability that a motion vector, having a quantity that exceeds what can be detected by the vector-detecting unit 7, is more likely near the telephoto side, at which the ratio of a change in the viewing angle to a change in the zoom lens position is larger. When a motion vector, having a quantity that exceeds what can be detected by the vector-detecting unit 7, occurs, the motion vector cannot be detected (a detection error).

Thus, in this exemplary embodiment, the zoom speed is controlled so as to keep the rate of change of the viewing angle caused by zooming approximately constant regardless of the zoom lens position so that the quantity of the motion vector (the second motion vector) caused by zooming does not exceeds what can be detected by the vector-detecting unit 7. In this way, reduction of the blurring of an image can be reliably performed while zooming is performed. This method will now be described.

Figure 6:
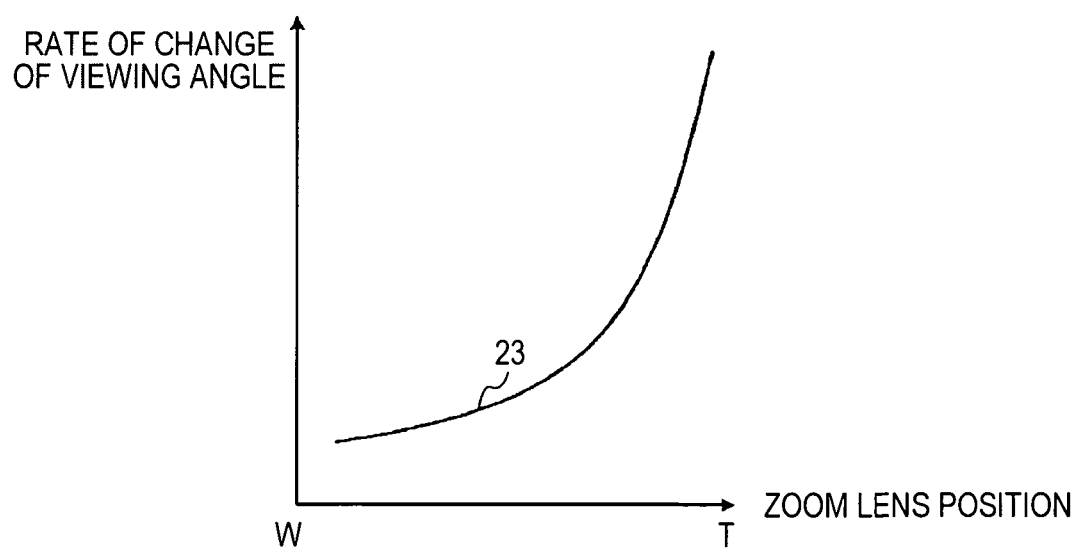
FIG. 6 is a graph showing the relationship between the zoom lens position and the rate of change of the viewing angle.

The relationship between the zoom lens position and the focal length is shown in FIG. 5, as described above. On the other hand, the rate of change of the focal length is in proportional to the rate of change of the viewing angle. Thus, the rate of change of the viewing angle depends on the zoom lens position, as shown in FIG. 6. In FIG. 6, the ordinate indicates the rate of change of the viewing angle, and the abscissa indicates the zoom lens position. Thus, a problem occurs, such that the quantity of a motion vector between consecutive field images changes according to the zooming operation.

Thus, in this exemplary embodiment, the zoom speed is controlled according to the zoom lens position so as to keep the rate of change of the viewing angle approximately constant regardless of the zoom lens position. In this case, an approximately constant rate of change in the viewing angle includes an allowance corresponding to a certain amount of fluctuation in the rate (in this exemplary embodiment, an amount of fluctuation that does not influence the result of reduction of the blurring of an image) caused by optical properties of the optical imaging system 1, and/or factors related to zoom control. This method for controlling the zoom speed will now be described.

Figure 7:
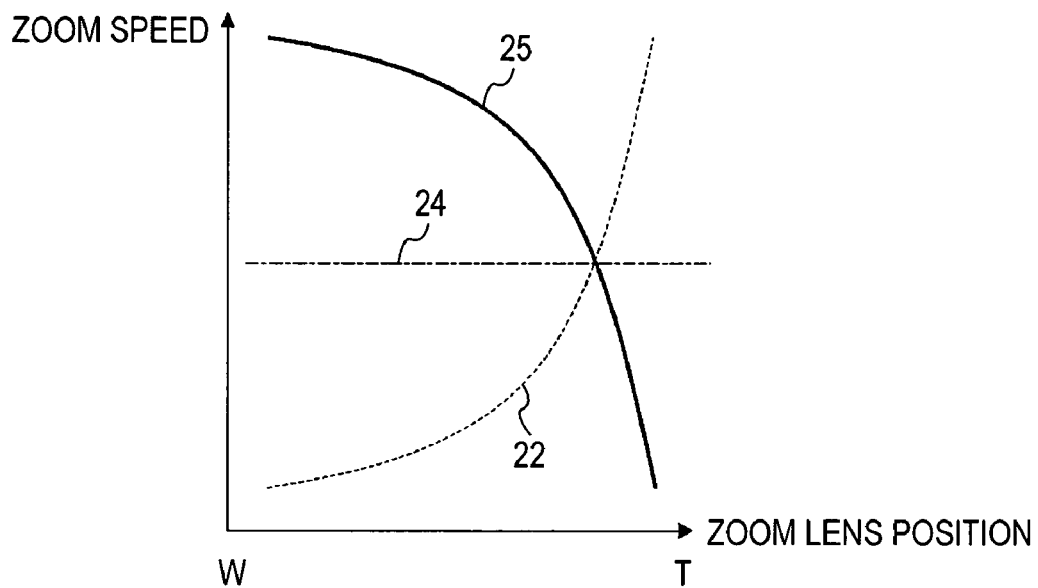
FIG. 7 is a graph showing the relationship between the zoom speed and the zoom lens position in the first exemplary embodiment in which the rate of change of the viewing angle is constant regardless of the zoom lens position.

In FIG. 7, the ordinate indicates the zoom speed, and the abscissa indicates the zoom lens position. A curve 22 represents the relationship between the zoom lens position and the zoom speed in a case where the method according to this exemplary embodiment for controlling the zoom speed is not used. In this exemplary embodiment, the zoom speed is controlled so that the relationship between the zoom speed and the zoom lens position is represented by a curve 25 that is substantially symmetrical to the curve 22 with respect to a straight line 24 that represents a focal length equal to "a", where "a" is an integer.

Figure 8:
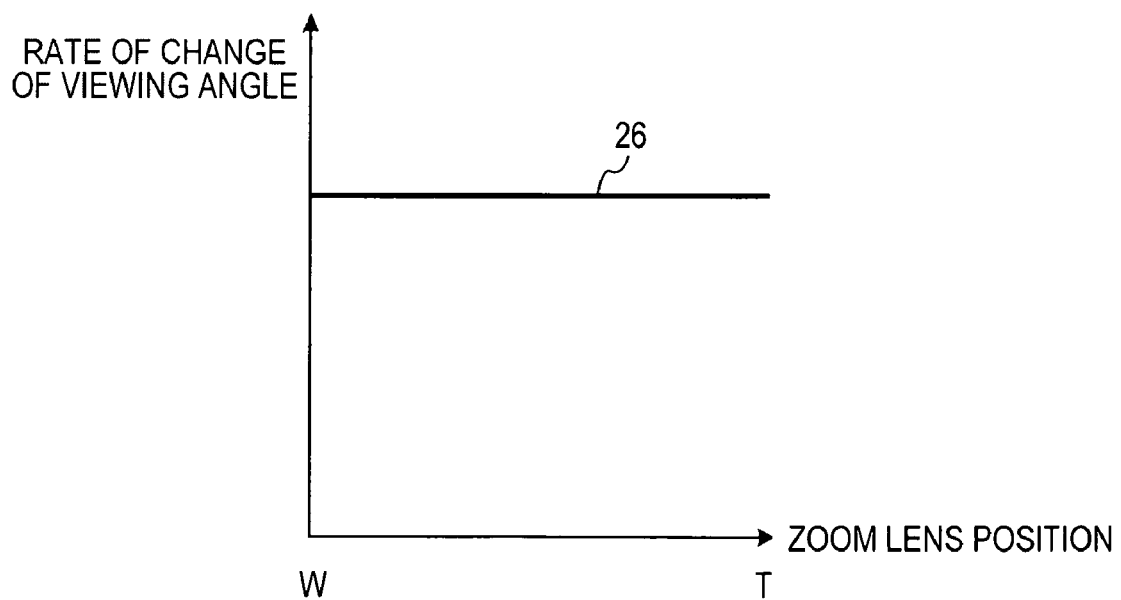
FIG. 8 is a graph showing the relationship between the zoom lens position and the rate of change of the viewing angle in a case where zoom control is performed so that the relationship shown in FIG. 7 is satisfied.

In this exemplary embodiment, the zoom speed is controlled so that the rate of change of the viewing angle is constant regardless of the zoom lens position, as shown in FIG. 8. That is to say, a change in the rate of change of the viewing angle to a change in the zoom lens position, according to characteristics of zooming shown in FIG. 6, is cancelled. In FIG. 8, the ordinate indicates the rate of change of the viewing angle, and the abscissa indicates the zoom lens position.

In this operation, the zoom speed is high at the wide (W) side, at which the rate of change of the focal length is small, and the zoom speed is low at the telephoto (T) side, at which the rate of change of the focal length is large. The rate of change of the viewing angle (FIG. 8) is kept constant over the whole range of zooming by this operation. Thus, it can be assumed that the quantity of a motion vector caused by a change in the viewing angle, while zooming is performed, is substantially constant over the whole range of zooming.

The data for controlling the zoom speed shown by the curve 25 in FIG. 7 is stored in the zoom-speed data table 11 in advance. The zoom-controlling unit 10 refers to the zoom-speed data table 11 on the basis of data of a zoom lens position detected by the zoom-position detecting unit 6 and accordingly controls the zoom drive unit 5. In this way, the zoom speed is controlled so that the rate of change of the viewing angle is kept approximately constant regardless of the zoom lens position over the whole range of zooming.

In this exemplary embodiment, in an arrangement (not shown with reference to the drawing), an output zoom speed can be determined by multiplying a coefficient by data of the lowest speed corresponding to the level of a zoom speed selected by a user. In this case, a zoom-speed data table can be stored in advance. The zoom-speed data table represents the lowest movement speed of a zoom lens at which the rate of change of the viewing angle is approximately constant over the whole range of zooming. The zoom speed can be controlled with a zoom-speed data table corresponding to the level of a zoom speed selected by the user. In this case, a plurality of zoom-speed data tables corresponding to respective levels of zoom speeds can be stored in advance.

Moreover, the quantity of the second motion vector corresponding to a predetermined rate of change in the viewing angle in each detection area can be stored in the vector-quantity table 12, in the indexed positions as shown in FIG.

13, in advance. This is because the quantity of the second motion vector caused by the movement of a zoom lens in each detection area varies with the detection area even when the rate of change of the viewing angle is approximately constant over the whole range of zooming.

In this exemplary embodiment, in an arrangement (not shown with reference to the drawing), the quantity of a motion vector caused by actual zooming can be determined by multiplying a coefficient by the vector quantity corresponding to the level of a zoom speed selected by the user. In this case, a vector-quantity data table can be stored in advance. The vector-quantity data table corresponds to the zoom-speed data table that represents the lowest movement speed of a zoom lens at which the rate of change of the viewing angle is approximately constant over the whole range of zooming. A vector-quantity data table corresponding to the level of a zoom speed selected by the user can be used. In this case, a plurality of vector-quantity data tables corresponding to respective levels of zoom speeds can be stored in advance.

A first motion vector 201 (FIG. 12) detected by the vector-detecting unit 7 is the vector sum of a second motion vector 202 caused by zooming and a third motion vector 203 caused by actual shaking of the imaging device, as shown in FIG. 12. Thus, the vector-calculating unit 8 subtracts the second motion vector 202 caused by zooming, which is derived from the vector-quantity table 12, from the detected first motion vector 201 to obtain the third motion vector 203 caused by actual shaking of the imaging device.

Then, the blurring-reduction unit 9 changes the area to be read on the basis of signals output from the vector-calculating unit 8, the signals representing the third motion vector 203 and serving as reduction signals. The area to be read represents an area of an image to be output that is output from the image pickup element 2 and has not been blurring reduced yet. Then, the blurring-reduction unit 9 sends data of the selected area to be read to the signal-processing circuit 3. The signal-processing circuit 3 outputs an image corresponding to the selected area to be read. This output image is selected from the image that is output from the image pickup element 2 and has not been blurring reduced yet. Thus, an output image is obtained, in which blurring, that is caused by shaking of the imaging device while zooming is performed, is reduced.

For example, this output image appears on a display (not shown) or is recorded onto a recording medium via the video-recording unit 4.

Second Exemplary Embodiment

In an imaging device that includes an optical imaging system that can change the viewing angle by driving a zoom lens and has an automatic focusing function, which controls the driving of a focus lens included in the optical imaging system, focus may not be maintained. Such a situation occurs when the focus lens cannot be controlled in a case where the zoom lens is driven at a high speed because an automatic focusing operation cannot follow a high-speed zooming operation. This is because focus control is performed by the contrast detection method (the TV-AF method) in an imaging device, such as a video camera. In the contrast detection method, a focal point at which the highest frequency component is achieved is searched for by driving the focus lens with reference to high frequency components in an image.

In the situation described above, even when the movement of the zoom lens is controlled as illustration in the first exemplary embodiment, motion vectors cannot be detected because a focus cannot be achieved. As a result, reduction of the blurring of an image is difficult in such circumstances. Thus, in a second exemplary embodiment, blurring of an image caused by shaking of the imaging device is reduced with the method shown in the first exemplary embodiment, and additionally, the zoom speed is controlled so that focus control does not fail. The second exemplary embodiment will now be described.

Figure 9:
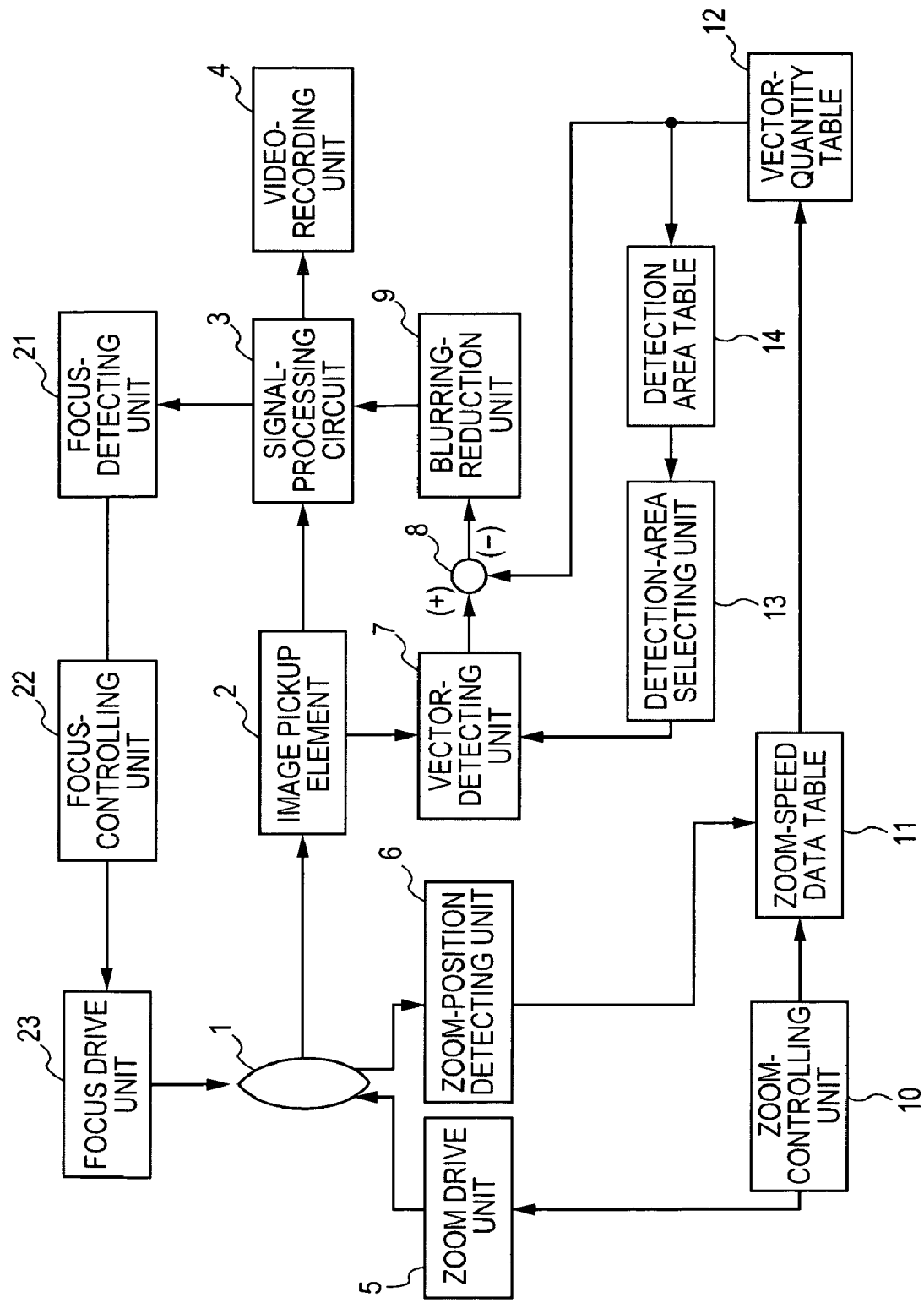
FIG. 9 is a system block diagram showing the structure of an imaging device according to a second exemplary embodiment of the present invention.

FIG. 9 is a system block diagram showing the structure of an imaging device according to the second exemplary embodiment. The same reference numerals are assigned to components that are common to the imaging device according to the first embodiment and the imaging device according to the second embodiment. These common components will not be described here.

As shown in FIG. 9, the imaging device additionally includes a focus-detecting unit 21, a focus-controlling unit 22, and a focus drive unit 23. The focus-detecting unit 21 extracts high frequency components corresponding to the state of focus of the optical imaging system 1 from an output image from the signal-processing circuit 3 (blurring of this output image may or may not be reduced yet). The focus-controlling unit 22 controls driving of the focus lens in the optical imaging system 1 so that a focal point at which the highest frequency component output from the focus-detecting unit 21 is achieved is searched for. The focus drive unit 23 includes an actuator that drives the focus lens according to signals from the focus-controlling unit 22.

In the second exemplary embodiment, basically, the zoom speed is controlled so that the rate of change of the viewing angle is constant regardless of the zoom lens position, as shown in FIG. 8. However, the limit of the zoom speed (hereinafter referred to as the maximum zoom speed) at which focus control can be performed in the middle of a zooming operation varies with the zoom lens position, as shown in, for example, FIG. 10. That is to say, the maximum zoom speed represented by the maximum zoom speed curve 27 is high and constant in a range from the wide side to an intermediate position between the wide side and the telephoto side, and significantly decreases in a range from the intermediate position to the telephoto side.

Figure 10:
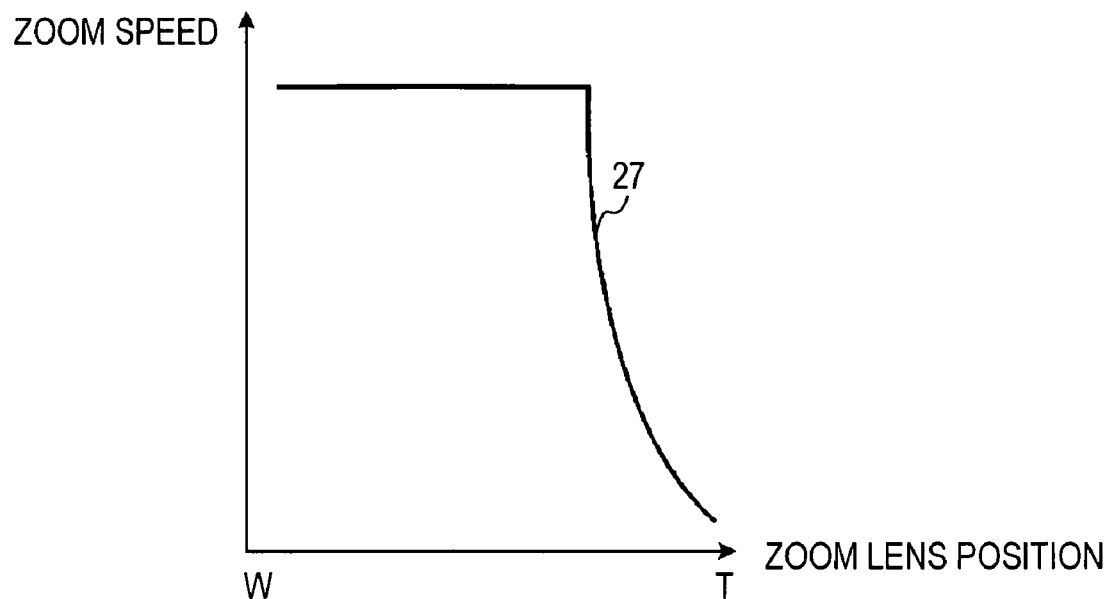
FIG. 10 is a graph showing the relationship between the zoom lens position and the maximum zoom speed in the second exemplary embodiment, the relationship enabling focus control.

In this case, in order to enable both extraction of motion vectors and focus control, zoom control can be performed so that an actual zoom speed is less than the zoom speed represented by the maximum zoom speed curve 27 shown in FIG. 10 and the zoom speed represented by the curve 25 shown in FIG. 7 in the first exemplary embodiment, the zoom speed represented by the curve 25 ensuring a constant rate of change in the viewing angle.

Figure 11:
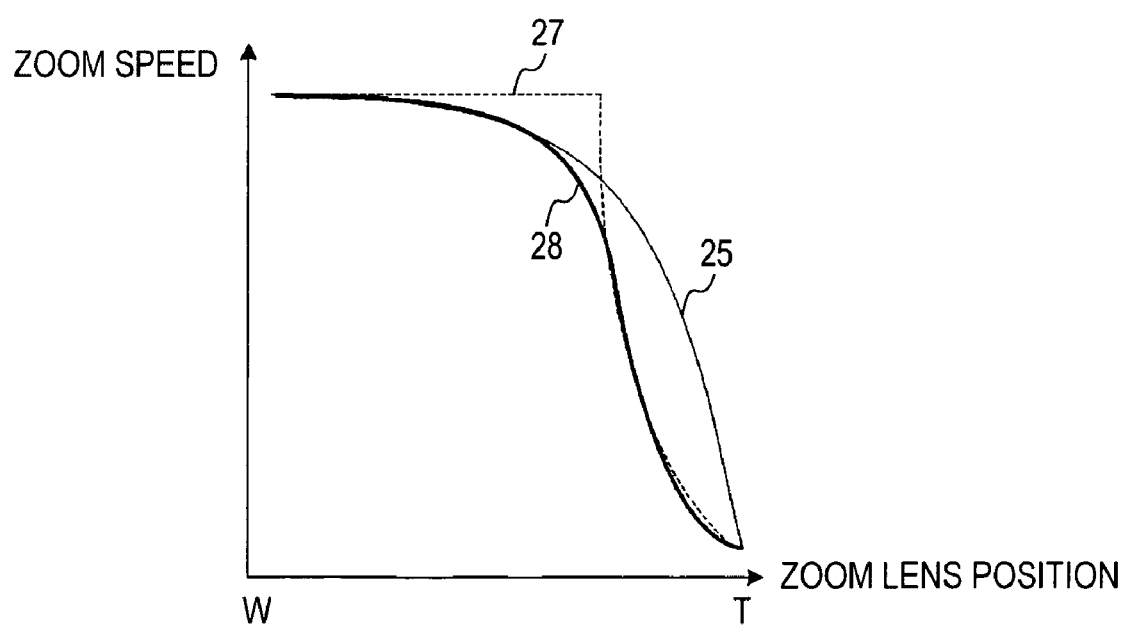
FIG. 11 is a graph showing the relationship between the zoom speed and the zoom lens position in the second exemplary embodiment, the relationship enabling both focus control and detection of moving vectors.

When zoom control is performed so as to satisfy this condition, a zoom speed curve 28 shown in FIG. 11 is obtained. A zooming operation in which motion vectors can be detected and focus control can be performed can be performed by this zoom control. In FIGS. 10 and 11, the ordinate indicates the zoom speed, and the abscissa indicates the zoom lens position.

Zoom speeds that are obtained in the way described above are stored in the zoom-speed data table 11 in advance, and the zoom-controlling unit 10 controls the zoom drive unit 5 with reference to the zoom-speed data table 11 on the basis of data of the zoom lens position detected by the zoom-position detecting unit 6.

In this exemplary embodiment, in an arrangement (not shown with reference to the drawing), an output zoom speed can be determined by multiplying a coefficient by data of the lowest speed corresponding to the level of a zoom speed selected by the user. In this case, a zoom-speed data table can be stored in advance. The zoom-speed data table represents the lowest movement speed of the zoom lens, which is determined in the way described above. The zoom speed can be controlled with a zoom-speed data table corresponding to the level of a zoom speed selected by the user. In this case, a plurality of zoom-speed data tables corresponding to respective levels of zoom speeds can be stored in advance.

The second exemplary embodiment is different from the first exemplary embodiment in that the rate of change of the viewing angle is not constant over the whole range of zooming in the second exemplary embodiment. Thus, the quantity of the second motion vector caused by the movement of the zoom lens in each detection area corresponding to the rate of change of the viewing angle (or the zoom speed) is calculated and stored in the vector-quantity table 12 shown in FIG. 13 in advance.

In this exemplary embodiment, in an arrangement (not shown with reference to the drawing), the quantity of a motion vector caused by actual zooming can be determined by multiplying a coefficient by the vector quantity corresponding to the level of a zoom speed selected by the user. In this case, a vector-quantity data table can be stored in advance. The vector-quantity data table corresponds to the zoom-speed data table that represents the lowest movement speed of the zoom lens. A vector-quantity data table corresponding to the level of a zoom speed selected by the user can be used. In this case, a plurality of vector-quantity data tables corresponding to respective levels of zoom speeds can be stored in advance.

As shown in FIG. 12, the first motion vector 201 detected by the vector-detecting unit 7 is the vector sum of the second motion vector 202 caused by zooming and the third motion vector 203 caused by shaking of the imaging device, as in the first exemplary embodiment. Thus, the vector-calculating unit 8 subtracts the second motion vector 202 caused by zooming, which is derived from the vector-quantity table 12, from the detected first motion vector 201 to obtain the third motion vector 203 caused by the actual shaking of the imaging device.

Then, the blurring-reduction unit 9 changes the area to be read on the basis of signals output from the vector-calculating unit 8, the signals representing the third motion vector 203, serving as reduction signals. The area to be read represents an area of an image that is output from the image pickup element 2 and has not had the blurring reduced yet. Then, the blurring-reduction unit 9 sends data of the selected area to be read to the signal-processing circuit 3. Then, the signal-processing circuit 3 outputs an image corresponding to the selected area to be read. This output image is selected from the image that is output from the image pickup element 2 and has not had the blurring reduced yet. Thus, after the blurring-reduction unit 9 changes the area to be read, an output image is obtained, in which blurring that is caused by shaking of the imaging device while zooming is performed is reduced.

The output image can appear on a display (not shown) or can be recorded onto a recording medium via the video-recording unit 4.

The methods for detecting motion vectors in the middle of a zooming operation of the imaging device and reducing blurring of an image on the basis of the motion vectors are described above. The present invention is not limited to these methods, and various modifications can be made without departure from the scope of the exemplary embodiments.

In the aforementioned exemplary embodiments, the imaging devices having what is called an electronic anti-shake function are described. Alternatively, for example, exemplary embodiments can be applied to an imaging device having an optical anti-shake function. For example, an exemplary optical anti-shake system can be a system for deflecting luminous flux that passes through by changing the vertex angle of a variable vertex angle prism provided in an optical path or a system for deflecting luminous flux that passes through by shifting a shift lens provided in an optical imaging system in the direction perpendicular to the optical axis. In such an optical anti-shake system, the third motion vector caused by actual shaking of the imaging device is obtained by calculating the difference between the first and second motion vectors, and thus the blurring of an image in the middle of a zooming operation is reduced by the driving control of the variable vertex angle prism or the shift lens on the basis of the third motion vector.

In the aforementioned exemplary embodiments, the imaging devices that include lenses are described. Exemplary embodiments are also applicable to an imaging device (e.g., a camera body) that is used with an interchangeable lens or an interchangeable lens. In this case, out of the components shown in FIG. 1, those related to processing of signals from the image pickup element 2, calculation of motion vectors, and reduction of the blurring can be provided on the camera body side, and those related to control of the zoom speed can be provided on the interchangeable lens side. Alternatively, those related to calculation of motion vectors and reduction of the blurring can be provided on the interchangeable lens side, and an image output from the image pickup element included in the camera body can be captured and processed by the interchangeable-lens side components.

In the aforementioned exemplary embodiments, optical zooming is performed by moving the zoom lens in the optical imaging system in the imaging system that includes the optical imaging system and the image pickup element. Exemplary embodiments are also applicable to a case where electronic zooming is performed in a signal-processing circuit included in an imaging system by electrically magnifying and reducing a captured image.

Third Exemplary Embodiment

In the first and second exemplary embodiments, reduction of the blurring of an image using motion vectors in the middle of a zooming operation is described. It can be determined whether a subject is a moving subject using the methods according to exemplary embodiments which can detect motion vectors in the middle of a zooming operation. In the first and second exemplary embodiments, the motion vector (the third motion vector) caused by shaking of the imaging device is extracted. When the third motion vector is extracted in the same way as in the first and second exemplary embodiments in a case where there is no shaking of the imaging device, the third motion vector is then caused by the movement of a subject.

When the third motion vector extracted in this way is used, it is determined whether a subject is a moving subject, and then an operation that follows the moving subject, for example, automatic focusing control, can be performed.

Fourth Exemplary Embodiment

In the first and second exemplary embodiments, reduction of the blurring of an image using motion vectors in the middle of a zooming operation was described. Image compression in the Motion Picture Experts Group (MPEG) format can be performed using the method according to exemplary embodiments which detect motion vectors in the middle of a zooming operation. Images obtained by encoding frames prior to and subsequent to the current frame are partially moved using the detected motion vectors. The differences between the resulting images and the original images are first extracted, and the extracted differences are subjected to discrete cosine transform (DCT) compression. High frequency components (detailed parts of an image) are reduced by performing quantization on the resulting data of the DCT compression. Since the detailed parts of an image include a large amount of data, the amount of data can be significantly reduced by reducing the high frequency components.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-003693 filed Jan. 11, 2005, which is hereby incorporated by reference herein in its entirety.

What is claimed is:

1. An imaging device comprising:
a detecting unit that detects a first motion vector in an image that is obtained via an imaging system that can perform zooming;
a storage unit that stores in advance a second motion vector caused by performing zooming of the image, wherein the second motion vector is determined by a rate of change of the viewing angle; and
a calculating unit that calculates a third motion vector from the first motion vector and the second motion vector, wherein the third motion vector is a motion vector where influence by performing zooming of the image is reduced.

2. The imaging device according to claim 1, wherein
a rate of change of a zoom magnification adjusted by performing zooming is approximately constant, and
the storage unit stores the second motion vector corresponding to the rate of change of a zoom magnification.

3. The imaging device according to claim 1, wherein
a rate of change of a zoom magnification adjusted by performing zooming changes, and
the storage unit stores the second motion vector corresponding to the rate of change of a zoom magnification.

4. The imaging device according to claim 1, further comprising a control unit that controls a speed of zooming so that the quantity of the second motion vector does not exceed a detectable range of the first motion vector.

5. The imaging device according to claim 4, wherein
a focus control in the imaging system can be performed, and
the control unit controls the speed of zooming in a range where the focus control can be performed while the zooming is performed.

6. The imaging device according to claim 1, further comprising a processing unit that performs processing in which blurring of an image is suppressed on the basis of the first motion vector and the second motion vector while zooming is performed.

7. The imaging device according to claim 1, further comprising a processing unit that performs processing in which a motion of a subject is determined on the basis of the first motion vector and the second motion vector while zooming is performed.

8. The imaging device according to claim 1, further comprising a processing unit that performs image-compressing on the basis of the first motion vector and the second motion vector while zooming is performed.

9. An imaging device according to claim 1, further comprising:
a vector detecting unit, wherein the vector detecting unit is configured to subtract the second motion vector from the first motion vector to obtain a third motion vector, wherein the third motion vector is associated with a motion causing blurring.

10. The imaging device according to claim 9, wherein the second motion vector is obtained from a vector-quantity table.

11. The imaging device according to claim 10, further comprising:
a blurring reduction unit configured to receive signals from a vector-calculating unit, the signals representing the third motion vector, and wherein the blurring reduction unit changes an area of an image to be read based upon the signals received.

12. An optical instrument comprising:
a detecting unit that detects a first motion vector in an image that is obtained via an imaging system that can perform zooming;
a control unit that controls the zooming so that the quantity of a second motion vector caused by performing zooming in the image does not exceed a detectable range of the first motion vector, wherein the second motion vector is determined by a rate of change of the viewing angle; and
a calculating unit that calculates a third motion vector from the first motion vector and the second motion vector, wherein the third motion vector is a motion vector where influence by performing zooming of the image is reduced.

* * * * *